(12) United States Patent
St. Pierre et al.

(10) Patent No.: US 7,525,965 B1
(45) Date of Patent: Apr. 28, 2009

(54) TRICK PLAY FOR MULTICAST STREAMS

(75) Inventors: Robert St. Pierre, Sunnyvale, CA (US); Viswanathan Swaminathan, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 854 days.

(21) Appl. No.: 11/172,352

(22) Filed: Jun. 30, 2005

(51) Int. Cl.
*H04L 12/56* (2006.01)
*H04J 3/26* (2006.01)

(52) U.S. Cl. .................. 370/390; 370/432; 370/486

(58) Field of Classification Search ............. 370/390, 370/432, 486; 709/245; 725/112
See application file for complete search history.

(56) References Cited

U.S. PATENT DOCUMENTS 7,296,091 B1 * 11/2007 Dutta et al. ............... 709/245
2004/0031058 A1 * 2/2004 Reisman ................... 725/112

* cited by examiner

*Primary Examiner*—John Pezzlo
(74) *Attorney, Agent, or Firm*—Osha • Liang LLP

(57) ABSTRACT

A method for performing trick-play functions in a multicast stream, involving generating a session announcement protocol (SAP) message, wherein the SAP announcement includes a first internet protocol (IP) address of a multicast source, forwarding the SAP message to a multicast router, wherein the multicast router includes an attached storage to cache the multicast stream, substituting the first IP address with a second IP address associated with the multicast router, requesting a trick-play function to obtain a unicast stream, and receiving the unicast stream from the attached storage based on the trick-play function.

20 Claims, 3 Drawing Sheets

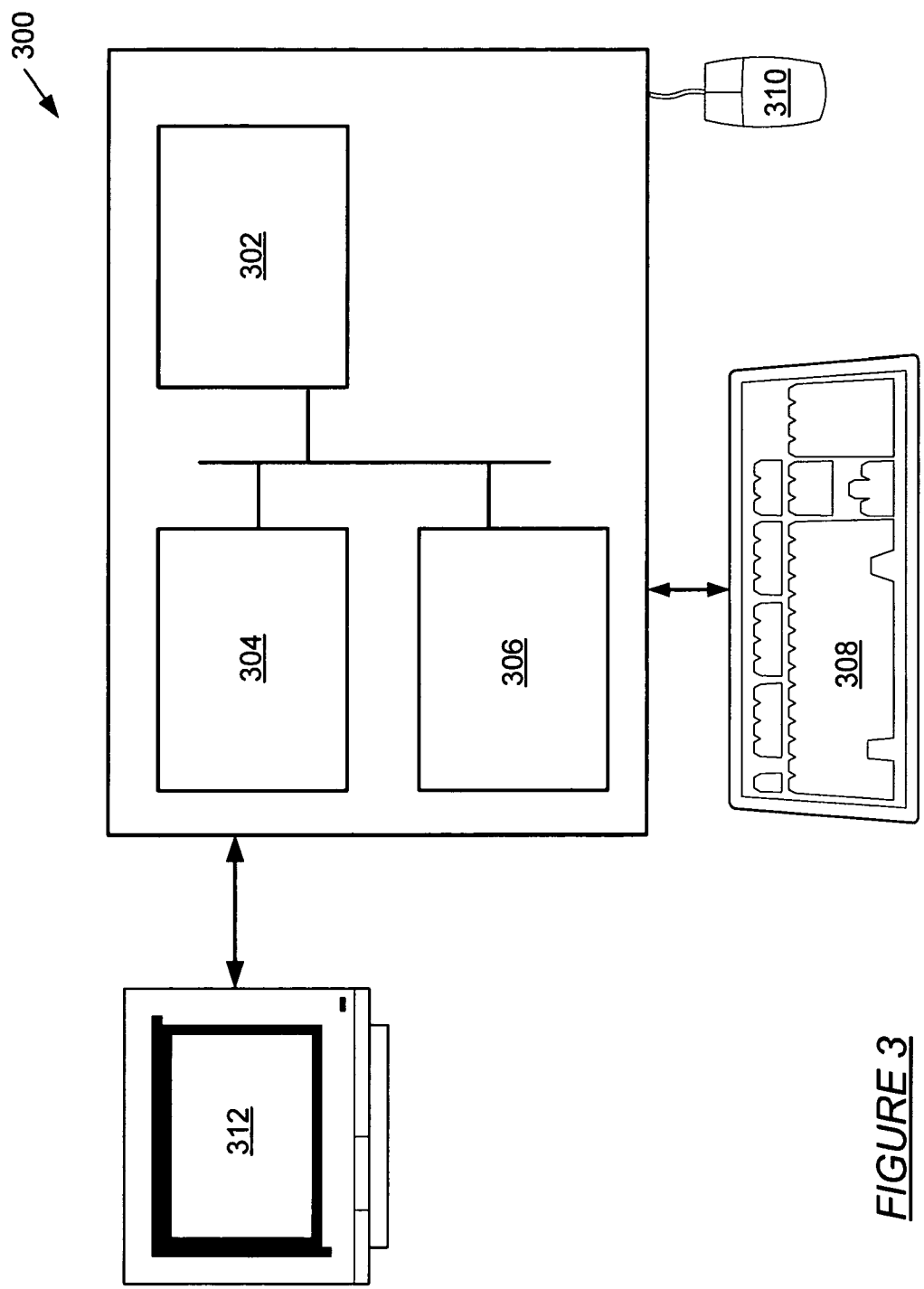

TRICK PLAY FOR MULTICAST STREAMS

BACKGROUND

Traditionally, Internet Protocol (IP) allows hosts to communicate in a variety of ways. The most common schemes involve unicast communication (i.e., one host communicating with one client) and broadcast communication (i.e., one host communicating with all clients). A third scheme provided by IP is multicasting, where one host communicates with a group of clients.

In multicasting, message streams broken into packets are delivered to a group identified by a single multicast group address. The sender uses the multicast group address as the destination address of a datagram to send packets to all the members of the multicast group. Thus, using multicasting, any host can send packets to a group, and members of the group receive the packets. Multicasting allows one host to serve many clients, while sending the packets only once. Typically, multicast packets are User Datagram Protocol (UDP) packets.

A common use of multicast communication is for sending digital audio/video streams. When an audio/video stream is sent to a multicast address, multicast enabled routers forward the packets across any interface that has hosts or routers that have joined the associated multicast address. The one-to-many relationship between a single multicast stream source and the many clients allows efficient delivery of the audio/video stream.

Further, the packets containing the multicast media stream may be advertised to potential clients using Session Announcement Protocol (SAP). SAP packets, in turn, are used to deliver Session Description Protocol (SDP) messages. To announce a multicast session, the multicast source multicasts (i.e., sends packets using a multicast address) packets periodically to a well-known multicast group carrying an SDP description of the session that is going to take place. Clients that wish to know which sessions are going to be active simply listen to the same well-known multicast group, and receive those announcement packets. The content of the SAP and SDP message provides potential clients with information associated with the multicast source, the multicast address to receive the multicast stream (i.e., IP addressing information for "tuning into" the multicast message stream), and the content of the multicast stream. Specifically, an individual SAP packet contains the IP multicast address information for the session which it describes.

Trick-play, which includes the ability to pause, fast forward, rewind, etc., a video or audio stream, requires an originating source (i.e., the sender of the on-demand stream) to change the on-demand stream based on commands from the client receiving the packets. Using real-time streaming protocol (RTSP), a client informs the originating source to perform trick-play functions, and the originating source produces a separate unicast stream specifically for the requesting client. This causes an increased load on the originating source.

Typically, the client uses trick-play for on-demand audio/video streams (including multicast streams) using a client-side buffer to store the audio/video stream from the originating source and manipulate the stream on the client-side (i.e., rewind, pause, etc. and receive the manipulated stream from the client-side buffer). In some cases, providing additional client-side resources and increasing the complexity of the client device may cause the client device to become expensive.

SUMMARY

In general, in one aspect, the invention relates to a method for performing trick-play functions in a multicast stream, comprising generating a session announcement protocol (SAP) message, wherein the SAP announcement comprises a first internet protocol (IP) address of a multicast source, forwarding the SAP message to a multicast router, wherein the multicast router comprises an attached storage to cache the multicast stream, substituting the first IP address with a second IP address associated with the multicast router, requesting a trick-play function to obtain a unicast stream, and receiving the unicast stream from the attached storage based on the trick-play function.

In general, in one aspect, the invention relates to a system for performing trick-play functions in a multicast stream, comprising a multicast source configured to generate a session announcement protocol (SAP) message associated with the multicast stream, wherein the SAP message comprises a first internet protocol (IP) address associated with the multicast source, at least one multicast router, wherein the at least one multicast router comprises an attached storage and is configured to modify the multicast stream based on a trick-play function to obtain a unicast stream, and a client configured to request the trick-play function and receive the unicast stream.

In general, in one aspect, the invention relates to a computer system for performing trick-play functions in a multicast stream, comprising a processor, a memory, a storage device, and software instructions stored in the memory for enabling the computer system under control of the processor, to generate a session announcement protocol (SAP) message, wherein the SAP announcement comprises a first internet protocol (IP) address of a multicast source, forward the SAP message to a multicast router, wherein the multicast router comprises an attached storage to cache the multicast stream, substitute the first IP address with a second IP address associated with the multicast router, request a trick-play function to obtain a unicast stream, and receive the unicast stream from the attached storage based on the trick-play function.

Other aspects and advantages of the invention will be apparent from the following description and the appended claims.

BRIEF DESCRIPTION OF DRAWINGS

FIG. 3 shows a computer system in accordance with one embodiment of the invention.

DETAILED DESCRIPTION

Figure 1:
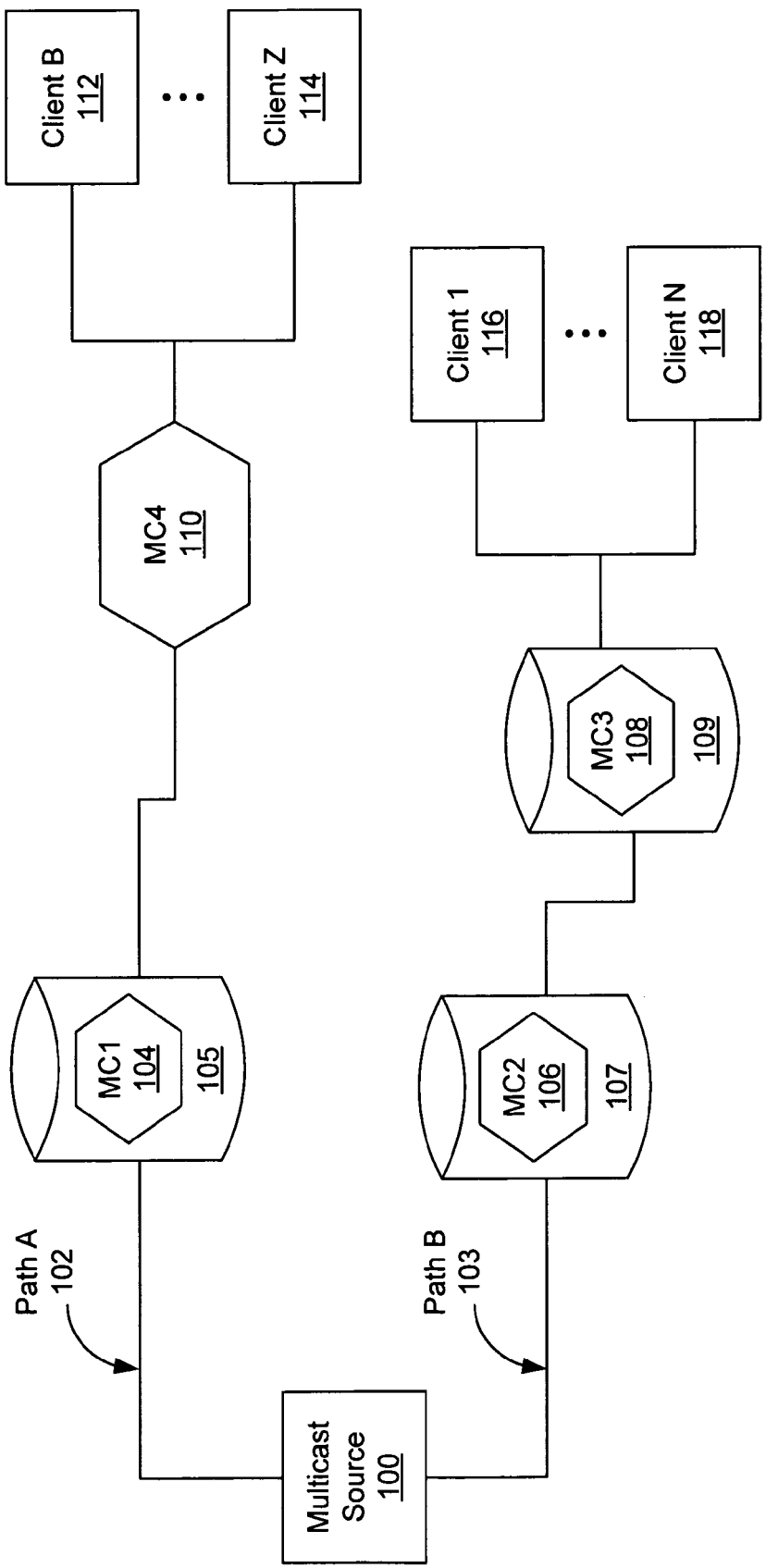
FIG. 1 shows a multicast system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method and system for implementing trick-play functionality in multicast streams. Specifically, embodiments of the invention relate to providing a potential client of a multicast stream with a preferred unicast address to receive content when entering trick-play mode. Further, embodiments of the invention relate to using multicast routers with attached storage capabilities to generate unicast streams to clients in trick-play mode.

FIG. 1 shows a multicast system in accordance with one embodiment of the invention. Specifically, FIG. 1 shows a multicast source (100), several multicast routers (i.e., MC1 (104), MC2 (106), MC3 (108), MC4 (110)), and several multicast clients (i.e., Client B (112), Client Z (114), Client 1 (116), Client N (118)) associated with specific multicast routers. For example, Client B (112) and Client Z (114) are associated with MC4 (110). In one embodiment of the invention, MC1 (104), MC2 (106), and MC3 (108) are multicast routers with attached storage (105, 107, 109). Those skilled in the art will appreciate that one multicast router can support several multicast clients. Further, those skilled in the art will appreciate that attached storage may be local storage or storage residing external to the multicast router that is accessible by the multicast router.

The multicast source (100) (e.g., a streaming server) includes functionality to send a multicast stream to multiple clients that subscribe to the multicast address on which the multicast stream is being sent. A multicast stream may be any live program, such as a live video program (e.g., sports game, television programming, news events, etc.), live audio program, etc. Further, multicast streams may be associated with cable broadcasting, satellite broadcasting, internet broadcasting, etc. Those skilled in the art will appreciate that although multicast streams are typically associated with live programming, the present invention is equally applicable to multicast streams associated with pre-recorded programming.

FIG. 1 shows two paths (i.e., Path A (102), Path B (103)) from the multicast source (100) to the clients (i.e., Client B (112), Client Z (114), Client 1 (116), Client N (118)). Path A (102) includes one multicast router with attached storage (i.e., MC1 (104) with attached storage (105)) and one multicast router without attached storage (MC4 (110)). Path B (103) shows two multicast routers with attached storage (i.e., MC2 (106) with attached storage (107), MC3 (108) with attached storage (109)). In one embodiment of the invention, the amount of attached storage for each multicast router may be determined using predictable analysis based on the amount of live programs that are scheduled for a given time period, the number of channels providing live programs, etc. In one embodiment of the invention, multicast routers with attached storage may be centrally managed by a management facility that monitors the resources, activity, failures, etc., of each multicast router.

In one embodiment of the invention, each multicast router with attached storage (i.e., MC1 (104), MC2 (106), MC3 (108)) includes functionality to cache a multicast stream sent by the multicast source (100) using its own attached storage (i.e., 105, 107, 109). In one embodiment of the invention, the multicast stream may be cached by a multicast router to provide trick-play functionality to clients (Client B (112), Client Z (114), Client 1 (116), Client N (118)). In one embodiment of the invention, trick-play functionality includes the ability to rewind, fast forward, pause, etc., a multicast stream being delivered to a client.

A multicast stream packet is sent from the multicast source (100) to a specific multicast address. Throughout the network, multicast routers forward the packet across any interface that has clients or additional multicast routers that have joined the multicast address. In one embodiment of the invention, each multicast router that includes attached storage includes functionality to provide clients associated with the multicast router with it own IP address, so that clients can use the IP address of the nearest multicast router with attached storage for trick-play functionality. Specifically, if a multicast router has attached storage, then the multicast router substitutes its own IP address for the multicast source's IP address in the SAP announcement associated with the multicast stream. In this manner, a client that requests trick-play functions uses real-time streaming protocol (RTSP) to send the trick-play request back to the multicast router whose IP address is provided to the client. RTSP is used when clients communicate with a unicast server. Specifically, RTSP allows two-way communication so that clients can communicate with the multicast router and employ trick-play functions. The multicast router is subsequently able to generate a unicast stream for the client requesting trick-play functions based on the cached multicast stream available to the multicast router.

Consider Path B (103) shown in FIG. 1. In one embodiment of the invention, when the SAP announcement is forward by the multicast source (100) to MC2 (106), MC2 (106) substitutes its own IP address in the SAP announcement for the multicast source's IP address, and forwards the SAP announcement on to MC3 (108). Because MC3 (108) also includes attached storage (109), MC3 (108) replaces MC2's IP address with its own IP address. Thus, clients (i.e., Client 1 (116), Client N (118)) associated with MC3 (108) are provided with the IP address of the closest multicast router with attached storage and switch to this unicast IP address when requesting trick-play functions. Now suppose further that Client 1 (116) requests trick-play functions upon commencement of the multicast stream. In one embodiment of the invention, Client 1 (116) switches to the unicast IP address of MC3 (108), requests a trick-play function, and MC3 (108) generates packets for the unicast stream and sends the packets to Client 1 (116).

Alternatively, in Path A (102), a single multicast router (e.g., MC1 (104)) with attached storage exists. In this case, MC1 (104) provides its IP address in the SAP announcement and forwards the SAP announcement to MC4 (110), which subsequently forwards the SAP announcement to the client. Because MC4 (110) does not include attached storage, when the client requests trick-play functionality, the client uses RTSP to communicate back to MC1 (104).

Figure 2:
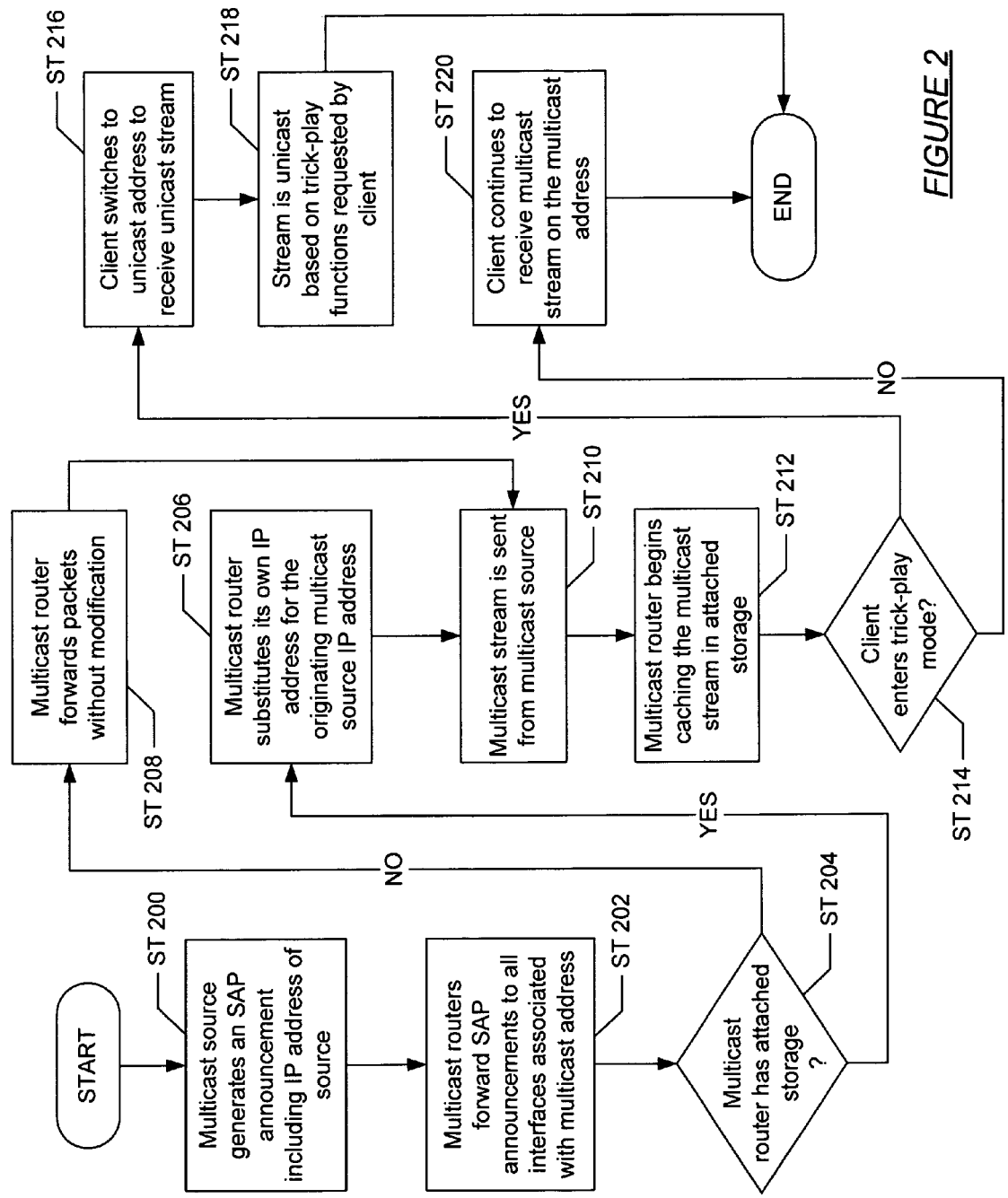
FIG. 2 shows a flow chart for requesting trick-play in multicast streams in accordance with one embodiment of the invention.

FIG. 2 shows a flow chart for providing trick-play functionality for a multicast stream in accordance with one embodiment of the invention. Initially, a multicast source generates an SAP announcement to clients listening on the multicast address (Step 200). As described above, the SAP announcement includes an SDP message, which describes the content of the program(s) that are provided by the originating source. The SAP announcement also includes IP address information (i.e., the IP address of the multicast session) so that potential clients can "tune into" the multicast stream. In one embodiment of the invention, the SAP announcement includes the IP address of the multicast source in the SAP header. Subsequently, multicast routers located in the path from the multicast source to the clients forward the SAP announcements to all the interfaces carrying multicast traffic for the multicast address (Step 202).

As the SAP announcement is received by each multicast router, a determination is made whether the multicast router includes attached storage (Step 204). In one embodiment of the invention, if a particular multicast router includes attached storage, then the multicast router may substitute its own IP address for the IP address of the multicast source (Step 206).

In this manner, the client contacts the multicast router with attached storage when requesting trick-play functionality, rather than contacting the multicast source. Alternatively, if a particular multicast router does not include attached storage, then the multicast router forwards the SAP announcement packet without modification (Step 208) to the next multicast router in the path (if another multicast router exists) or to the client. Those skilled in the art will appreciate that either the SAP portion or the SDP portion of the SAP announcement may be modified with the multicast router's IP address.

As mentioned above, in a network with multiple multicast routers, the last multicast router with attached storage (i.e., the closest multicast router to the client) substitutes its own IP address in the SAP header and this multicast router is represented to client as the "originating source." Those skilled in the art will appreciate that a particular multicast router with attached storage may choose not to modify the SAP header with its own IP address when passing on the SAP packets if, for example, the multicast router already has too many active trick-play streams, etc. Further, those skilled in the art will appreciate that multicast routers (both with and without attached storage) may decrement the time-to-live (TTL) in the IP header of the SAP announcement packet(s) as the packet(s) are forwarded.

Continuing with FIG. 2, upon completing the SAP announcement to potential clients, the multicast stream is sent by the multicast source (Step 210) and the clients that want to receive the multicast stream "tune into" the multicast address provided to them in the SAP announcement. Subsequently, the multicast routers with attached storage in the path from the multicast source to the one or more clients that receive the multicast stream begin caching the multicast stream (Step 212). Specifically, when a client receives the SAP announcement, the client sends a JOIN message, indicating that the client wishes to join the multicast address as part of the group that receives the multicast stream sent by the multicast source. Further, the multicast routers register the JOIN message sent by the client.

In one embodiment of the invention, within the JOIN message, a client may indicate that the client is capable of trick-play functions. As described above, the trick-play mode of operation includes allowing a client to control the multicast stream by rewinding, fast forwarding, pausing, etc., the multicast stream. Thus, if a multicast router with attached storage registers a JOIN message, then the multicast router knows that the multicast stream needs to be cached to provide trick-play functionality to the client. In one embodiment of the invention, the multicast router may cache the raw stream exactly as received from the multicast source. In this case, the multicast router may generate multicast packets for a client using trick-play on the fly. Alternatively, in one embodiment of the invention, the multicast router may use the data to pre-generate playout files for forward and reverse streams at various playout speeds. In the latter case, for example, a multicast router may build a snapshot of what the stream would look like at four times the speed, and subsequently delivered to the client.

In one embodiment of the invention, predictable analysis may be performed to determine whether one or more clients served by a particular multicast router with attached storage are planning to join the multicast address. In this manner, a multicast router does not waste resources in caching a multicast stream if no interested clients exist that may perform trick-play functions to receive a unicast stream. Further, in one embodiment of the invention, a multicast router with attached storage may cache a specific number of minutes of the multicast stream, a specific number of megabytes of the multicast stream, etc. Thus, in this manner, when a particular cache is full, the cache can be optimized using methods well known in the art to delete content that is old and create space for incoming multicast stream packets that need to be cached.

Continuing with FIG. 2, at this stage, a determination is made whether a client enters trick-play mode (Step 214). In one embodiment of the invention, if a client enters trick-play mode, then the client switches to the unicast IP address provided to the client in the SAP announcement packet header (Step 216). At this stage, the stream is unicast based on the trick-play functions requested by the client (i.e., a unicast stream is fast forwarded to a point, rewound to a point, paused, etc.) (Step 218). In one embodiment of the invention, the unicast address is the IP address of the closest multicast router with attached storage to the client. Because the multicast router with attached storage that is closest to the client has already cached the multicast stream, the multicast router is able to provide a unicast stream to the client based on the trick-play functions requested by the client. Those skilled in the art will appreciate that if the closest multicast router with attached storage does not cache the multicast stream for any reason, then a multicast router elsewhere in the path provides the unicast stream to the client requesting trick-play functions. Alternatively, if a client does not enter trick-play mode, then the client continues to receive the original multicast stream on the multicast address (Step 220) and the process ends. Those skilled in the art will appreciate that Step 214 may occur at any time during the length of the multicast stream.

In one embodiment of the invention, when a client previously using trick-play functions no longer needs trick-play functionality or catches up to the live multicast stream, the client may switch back from the unicast IP address to the multicast address. For example, if a client rewinds to a particular portion of a live program and subsequently fast forwards ahead to catch up to the multicast stream as it is currently being sent to the multicast address, the client may switch from a multicast router's IP address to the multicast address. Alternatively, in one embodiment of the invention, the client may continue viewing the multicast stream using the unicast IP address provided by the multicast router.

In one embodiment of the invention, if a multicast router issues a JOIN and "record" session before receiving a trick-play request from a client, a failover from one caching router to another catching router may take place in the event of a multicast router failure or network partitioning. For example, suppose that Multicast Router B, which is close to the client, receives an SAP announcement with the original source IP address already changed by Multicast Router A earlier in the path. In this case, Multicast Router B may make a note of Multicast Router A's IP address and use that IP address to re-route a multicast stream when Multicast Router B fails. Alternatively, if Multicast Router B fails, Multicast Router A may access the attached storage of Multicast Router B and provide a client with a unicast stream based on the amount of the multicast stream that was cached by Multicast Router B.

Those skilled in the art will appreciate that the present invention may be used for multicast communication for cable broadcasting, satellite broadcasting, internet broadcasting, etc. For example, consider the scenario in which a live sporting event is being multicast to several clients over the Internet. Using the method of the present invention, a particular client would be able to request trick-play functions for the live sporting event. Specifically, consider the case in which a cascade of multicast routers with attached storage are added in the path between the multicast source and the several clients receiving the multicast stream. In this case, the nearest multicast router with attached storage that can handle trick-play functionality for the sporting event would provide its own IP address to the clients that send a modified JOIN request. Upon registering the JOIN request, the nearest multicast router is made aware of which clients are capable of trick-play functions. Subsequently, when the live sporting event is sent by the multicast source to the multicast address, the clients listen to the port number specified in the SAP announcement of the sporting event and receive the multicast stream of the sporting event.

In parallel, the multicast router begins caching the multicast stream in attached storage. When a client requests trick-play functions, the client switches to the unicast IP address of the multicast router and communicates with the multicast router via real-time streaming protocol (RTSP) to receive a unicast stream based on the trick-play functions requested by the client. For example, if the client rewinds the sporting event to replay a particular portion of the multicast stream, the multicast router generates a unicast stream beginning at a previous point in the multicast stream. Those skilled in the art will appreciate that the client may return to the multicast address when the client no longer needs trick-play functions or is caught up to the live broadcast of the sporting event. Alternatively, in one embodiment of the invention, the client may continue listening to the unicast IP address for the remainder of the multicast stream.

Those skilled in the art will appreciate that the unicast IP address may change if the nearest multicast router's attached storage becomes full or the multicast router becomes overloaded. As noted above, the nearest multicast router may make a note of the multicast router one level above in the cascade and pass over the caching of the multicast stream to this multicast router. Further, in one embodiment of the invention, multicast routers may be dynamically added to the path based on the load experienced by each of the multicast routers.

One or more embodiments of the invention may be implemented on virtually any type of computer regardless of the platform being used. For example, as shown in FIG. 3, a networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a local area network (LAN) or a wide area network via a network interface connection (not shown). Those skilled in the art will appreciate that these input and output means may take other forms. Further, those skilled in the art will appreciate that one or more elements of the aforementioned computer (300) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a method for allowing trick-play functionality to be implemented for multicast streams without putting resource demands on each client or overloading the multicast source. Because the last trick-play enabled multicast router has its IP address represented to the client, trick-play load may be spread across multiple multicast routers with attached storage, which results in pushing the load closer to each requesting client. Further, embodiments of the invention allow for multicast routers with attached storage to be added dynamically as load requires. As long as each multicast router supports SAP, each router may handle trick-play in its own way.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing trick-play functions in a multicast stream, comprising:
   generating a session announcement protocol (SAP) message, wherein the SAP announcement comprises a first internet protocol (IP) address of a multicast source;
   forwarding the SAP message to a multicast router, wherein the multicast router comprises an attached storage to cache the multicast stream;
   substituting the first IP address with a second IP address associated with the multicast router;
   requesting a trick-play function to obtain a unicast stream; and
   receiving the unicast stream from the attached storage based on the trick-play function.

2. The method of claim 1, further comprising:
   switching to the second IP address to receive the unicast stream, wherein the second IP address is a unicast IP address.

3. The method of claim 1, further comprising:
   sending the multicast stream to a client using a multicast address.

4. The method of claim 1, further comprising:
   registering a JOIN request received from a client, wherein the JOIN request is modified to request trick-play functionality.

5. The method of claim 1, wherein the trick-play function comprises at least one selected from the group consisting of rewinding the multicast stream, fast forwarding the multicast stream, playing the multicast stream in slow motion, and pausing the multicast stream.

6. The method of claim 1, wherein the multicast stream comprises one selected from the group consisting of live video programs and live audio programs.

7. The method of claim 1, wherein the SAP message delivers session description protocol (SDP) messages describing multicast stream information.

8. The method of claim 1, wherein a trick-play stream is generated on the fly by the multicast router.

9. The method of claim 1, wherein the unicast stream is pre-generated by the multicast router to play out the unicast stream at different speeds.

10. A system for performing trick-play functions in a multicast stream, comprising:
    a multicast source configured to generate a session announcement protocol (SAP) message associated with the multicast stream, wherein the SAP message comprises a first internet protocol (IP) address associated with the multicast source;
    at least one multicast router, wherein the at least one multicast router comprises an attached storage and is configured to modify the multicast stream based on a trick-play function to obtain a unicast stream; and
    a client configured to request the trick-play function and receive the unicast stream.

11. The system of claim 10, wherein the at least one multicast router is further configured to replaced the first IP address with a second IP address associated with the at least one multicast router in the SAP message.

12. The system of claim 10, wherein the multicast stream comprises one selected from the group consisting of live video programs and live audio programs.

13. The system of claim 10, wherein the trick-play function comprises at least one selected from the group consisting of rewinding the multicast stream, fast forwarding the multicast stream, playing the multicast stream in slow motion, and pausing the multicast stream.

14. The system of claim 10, wherein the multicast source sends the multicast stream to the client using a multicast address.

15. The system of claim 10, wherein the client switches to the second IP address to receive the unicast stream, wherein the second IP address is a unicast IP address.

16. The system of claim 10, wherein the client sends a JOIN request to the at least one multicast router when the client requests the trick-play function.

17. The system of claim 10, wherein the at least one multicast router is further configured to issue a JOIN request prior to the client requesting the trick-play function.

18. The system of claim 10, wherein the SAP announcement delivers session description protocol (SDP) messages that describe multicast stream information.

19. A computer system for performing trick-play functions in a multicast stream, comprising:
   a processor;
   a memory;
   a storage device; and
   software instructions stored in the memory for enabling the computer system under control of the processor, to:
   generate a session announcement protocol (SAP) message, wherein the SAP announcement comprises a first internet protocol (IP) address of a multicast source;
   forward the SAP message to a multicast router, wherein the multicast router comprises an attached storage to cache the multicast stream;
   substitute the first IP address with a second IP address associated with the multicast router;
   request a trick-play function to obtain a unicast stream; and
   receive the unicast stream from the attached storage based on the trick-play function.

20. The computer system of claim 19, wherein software instructions stored in the memory further enable the computer system under control of the processor, to:
   switch to the second IP address to receive the unicast stream, wherein the second IP address is a unicast IP address.

* * * * *